(12) United States Patent
Chien

(10) Patent No.: US 9,491,080 B2
(45) Date of Patent: Nov. 8, 2016

(54) INDICATOR CIRCUIT AND ELECTRONIC DEVICE

(71) Applicant: HON HAI PRECISION INDUSTRY CO., LTD., New Taipei (TW)

(72) Inventor: Tung-Liang Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 53 days.

(21) Appl. No.: 14/481,450

(22) Filed: Sep. 9, 2014

(65) Prior Publication Data

US 2015/0287292 A1 Oct. 8, 2015

(30) Foreign Application Priority Data

Apr. 2, 2014 (TW) .............................. 103112385 A

(51) Int. Cl.
G08B 21/00 (2006.01)
H04L 12/26 (2006.01)
G06F 13/38 (2006.01)
H04B 1/00 (2006.01)

(52) U.S. Cl.
CPC ......... *H04L 43/0888* (2013.01); *G06F 13/385* (2013.01); *H04B 1/005* (2013.01)

(58) Field of Classification Search
CPC ............ G09G 3/3283; H05B 37/0272; G06F 13/385; A61B 5/0073; H03F 3/245; H03F 1/0227

USPC ............ 340/687, 815.45, 540; 370/244, 529, 370/458, 535; 725/118, 98; 315/294
See application file for complete search history.

(56) References Cited

U.S. PATENT DOCUMENTS

| | | | |
|---|---|---|---|
| 2003/0163829 A1* | 8/2003 | Coufal | H04N 7/16 725/118 |
| 2005/0057455 A1* | 3/2005 | Peng | G09G 3/3283 345/76 |
| 2006/0130100 A1* | 6/2006 | Pentland | H04N 7/17318 725/68 |
| 2011/0128816 A1* | 6/2011 | Baba | A61B 5/0073 367/11 |
| 2012/0274474 A1 | 11/2012 | Zhou | |
| 2015/0136037 A1* | 5/2015 | Boonekamp | A01K 61/00 119/226 |

FOREIGN PATENT DOCUMENTS

| | | |
|---|---|---|
| CN | 201698406 U | 1/2011 |
| JP | 2000124925 A | 4/2000 |
| TW | M340667 | 9/2008 |

* cited by examiner

*Primary Examiner* — Hoi Lau
(74) *Attorney, Agent, or Firm* — Zhigang Ma

(57) ABSTRACT

An indicator circuit comprises a first logic circuit, a second logic circuit, a third logic circuit, an auxiliary power circuit, a switch circuit, and a light emitting diode (LED) circuit. The switch circuit controls whether the LED circuit lights or not, according to the first logic circuit, the second logic circuit, and the third logic circuit, to indicate connections to different data bandwidths.

20 Claims, 3 Drawing Sheets

Delay circuit (Y1、Y2)=>

| Ck | D | Q+1 |
|---|---|---|
| from low to high | 0 | 0 |
| from low to high | 1 | 1 |
| from low to high | X | keep Q |

XOR (K3、K4)=>

| A | B | Y |
|---|---|---|
| 0 | 0 | 0 |
| 0 | 1 | 1 |
| 1 | 0 | 1 |
| 1 | 1 | 0 |

OR (K2)=>

| A | B | Y |
|---|---|---|
| 0 | 0 | 0 |
| 0 | 1 | 1 |
| 1 | 0 | 1 |
| 1 | 1 | 1 |

AND (K1)=>

| A | B | Y |
|---|---|---|
| 0 | 0 | 0 |
| 0 | 1 | 0 |
| 1 | 0 | 0 |
| 1 | 1 | 1 |

NOR (K5)=>

| A | B | Y |
|---|---|---|
| 0 | 0 | 1 |
| 0 | 1 | 0 |
| 1 | 0 | 0 |
| 1 | 1 | 0 |

FIG. 3

INDICATOR CIRCUIT AND ELECTRONIC DEVICE

FIELD

The disclosure relates to electronic devices, and particularly to indicators in electronic devices.

BACKGROUND

User demand for bandwidth of the wireless network is getting greater all the time There is room for improvement in the field. The telecom server demands that access points can receive and transmit data over a plurality of different bandwidths (such as 2.4 gigabytes per second (G) or 5G).

BRIEF DESCRIPTION OF THE DRAWINGS

Many aspects of the present embodiments can be better understood with reference to the appended drawings. The components in the drawings are not necessarily drawn to scale, the emphasis instead being placed upon clearly illustrating the principles of the present embodiments. Moreover, in the drawings, like reference numerals designate corresponding parts throughout the several views.

FIG. 3 is a truth table of one embodiment of a plurality of logic gates of the electronic device of FIG. 2.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

Figure 1:
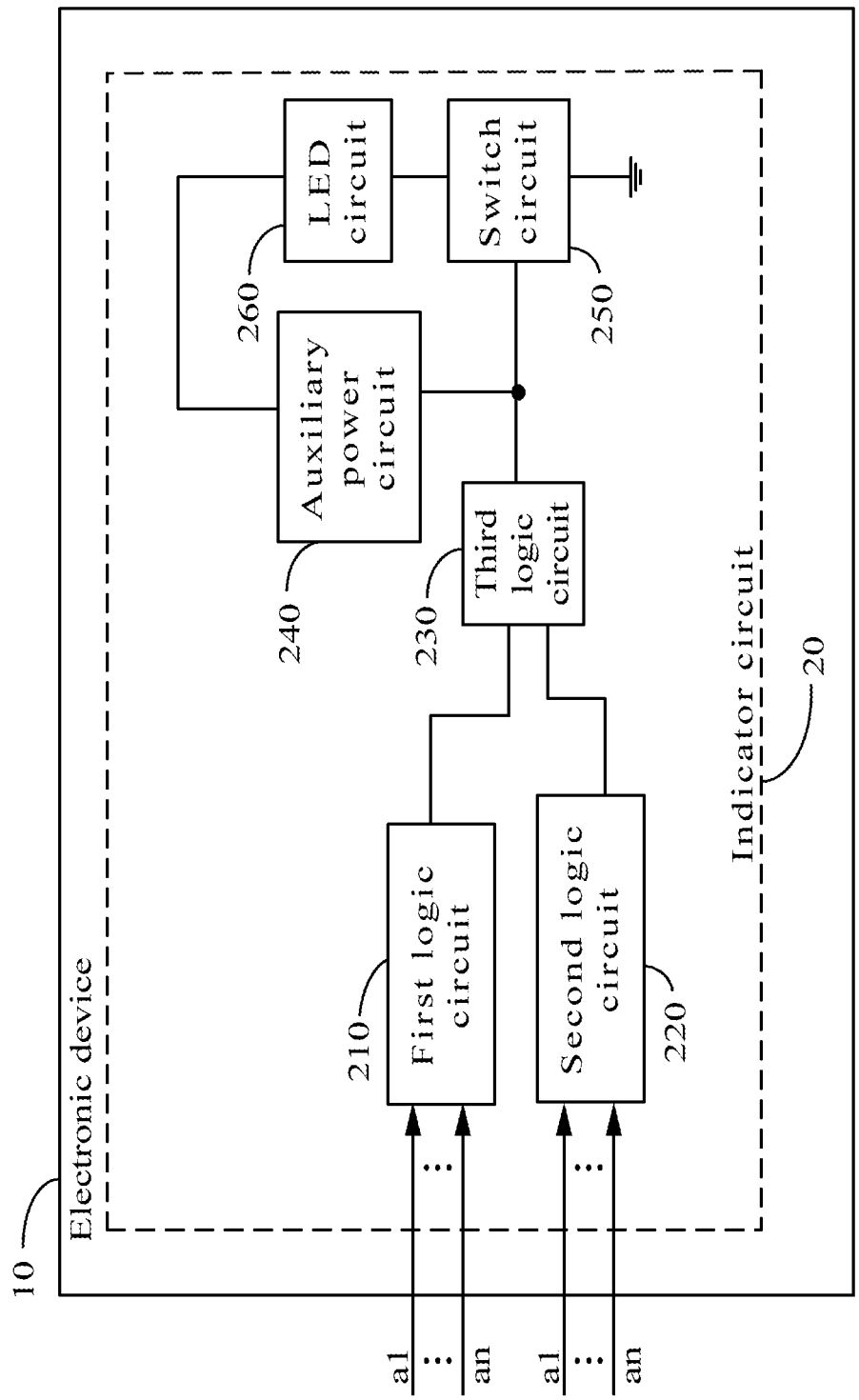
FIG. 1 is a circuit diagram of one embodiment of an indicator circuit and an electronic device.

FIG. 1 is a circuit diagram of one embodiment of an indicator circuit 20 and an electronic device 10. In one embodiment, the electronic device 10, supporting a plurality of different bandwidths (a1, a2 . . . an), comprises the indicator circuit 20, and the electronic device 10 receives data over the different bandwidths (a1, a2 . . . an). In one embodiment, the electronic device 10 receives 2.4 gigabytes per second (G) signals and 5G signals.

In at least one embodiment, the indicator circuit 20 can comprise a first logic circuit 210, a second logic circuit 220, a third logic circuit 230, an auxiliary power circuit 240, a switch circuit 250, and a light emitting diode (LED) circuit 260.

The first logic circuit 210 comprises an output and a plurality of inputs. The inputs of the first logic circuit 210 receive network signals indicating whether or not the electronic device 10 is receiving data by any one of the different bandwidths (a1, a2 . . . an), and the output of the first logic circuit 210 is electronically connected to the third logic circuit 230. The first logic circuit 210 outputs a first decision signal to the third logic circuit 230 dependent upon whether or not the electronic device 10 is receiving data by any one of the different bandwidths (a1, a2 . . . an). In one embodiment, the number of the inputs of the first logic circuit 210 is equal to the number of the different bandwidths available (a1, a2 . . . an), the first decision signal is a low or a high level signal.

In one embodiment, when the electronic device 10 receives data by any one of the different bandwidths (a1, a2 . . . an), the inputs of the first logic circuit 210 receive level signals changed between a high level and a low level The first logic circuit 210 outputs the first decision signal changed between a high level and a low level to the third logic circuit 230. When the electronic device 10 is not receiving data by any one of the different bandwidths (a1, a2 . . . an), all of the inputs of the first logic circuit 210 receive low level signals, and the first logic circuit 210 outputs a high level signal to the third logic circuit 230.

The second logic circuit 220 comprises an output and a plurality of inputs. The inputs of the second logic circuit 220 receive signals indicating whether or not the electronic device 10 is is receiving data by the different bandwidths (a1, a2 . . . an), and the output of the second logic circuit 220 is electronically connected to the third logic circuit 230. The second logic circuit 220 outputs a second decision signal to the third logic circuit 230 dependent upon whether or not the electronic device 10 is is receiving data by any one of the different bandwidths (a1, a2 . . . an). In one embodiment, the number of the inputs of the second logic circuit 220 is equal to the number of the different bandwidths available (a1, a2 . . . an). The second decision signal is a low or a high level signal.

In one embodiment, when the electronic device 10 receives data by any one of the different bandwidths (a1, a2 . . . an), at least one of the inputs of the second logic circuit 220 receive a high level signal, and the second logic circuit 220 outputs a high level signal to the third logic circuit 230. When the electronic device 10 is not connected to is receiving data by any one of the different bandwidths (a1, a2 . . . an), all of the inputs of the second logic circuit 220 receive low level signals, and the second logic circuit 220 accordingly outputs a low level signal to the third logic circuit 230.

The third logic circuit 230 comprises two inputs and one output. The two inputs of the third logic circuit 230 are electronically connected to the respective outputs of the first and second logic circuits, 210 and 220, the output of the third logic circuit 230 is electronically connected to the switch circuit 250. The third logic circuit 230 outputs a third decision signal to the switch circuit 250, according to the first decision signal outputted by the first logic circuit 210 and the second decision signal outputted by the second logic circuit 220. In one embodiment, when the first decision signal is a high level signal, and the second decision signal is a high level signal, the third logic circuit 230 outputs a high level signal to the switch circuit 250. When the first decision signal is a low level signal, and the second decision signal is a low level signal, the third logic circuit 230 outputs a low level signal to the switch circuit 250.

One end of the LED circuit 260 is electronically connected to the auxiliary power circuit 240 The other end of the LED circuit 260 is electronically connected to the switch circuit 250.

One end of the auxiliary power circuit 240 is electronically connected to the LED circuit 260. The other end of the auxiliary power circuit 240 is electronically connected to a node between the third logic circuit 230 and the switch circuit 250. The auxiliary power circuit 240 supplies an auxiliary power signal for the LED circuit 260.

The switch circuit 250 comprises a first port, a second port, and a control port. The first port of the switch circuit 250 is electronically connected to the LED circuit 260, the second port is grounded, and the control port is electronically connected to the output of the third logic circuit 230.

The switch circuit 250 controls the second port to connect to or disconnect from the control port of the switch circuit 250 and the first port to connect to or disconnects from the second port of the switch circuit 250 (to turn on or turn off the switch circuit 250), according to the third decision signal and the auxiliary power signal. Therefore, the switch circuit 250 controls whether or not the LED circuit 260 lights. In one embodiment, when the second port connects to the control port of the switch circuit 250, the auxiliary power circuit 240 outputs the auxiliary power signal for the LED circuit 260 to control the first port connecting to the second port of the switch circuit 250. In one embodiment, when the third decision signal is a low level signal, the second port disconnects from the control port of the switch circuit 250, the first port disconnects from the second port of the switch circuit 250, and the LED circuit 260 does not light. When the third decision signal is a high level signal, the second port connects to the control port of the switch circuit 250, the auxiliary power circuit 240 outputs the auxiliary power signal to ground through the second port and the control port of the switch circuit 250, the first port connects to the second port of the switch circuit 250, and the LED circuit 260 lights.

In one embodiment, the LED circuit 260 lights upon the sole condition that the first port of the switch circuit 250 is connected to the second port, and the LED circuit 260 does not light if the first port is disconnected from the second port.

In one embodiment, the data is a series of alternating high level and low level signals. When the electronic device 10 receives data through any one of the different bandwidths (a1, a2 . . . an), the inputs of the first logic circuit 210 receive level signals changed between a high level and a low level. The first logic circuit 210 outputs the first decision signal changed between a high level and a low level to the third logic circuit 230. When the second logic circuit 220 determines that electronic device 10 receives data by any one of the different bandwidths (a1, a2 . . . an), at least one of the inputs of the second logic circuit 220 receives high level signals, and the first logic circuit 210 outputs a high level signal to the third logic circuit 230. The third logic circuit 230 outputs the third decision signal changed between a high level and a low level to the switch circuit 250, according to the first logic circuit 210 and the second logic circuit 220. The first port of the switch circuit 250 alternately connects to and disconnects from the second port, which makes the LED circuit 260 switch between a lit and a non-lit state (a flashing state).

When the first logic circuit 210 determines that electronic device 10 is not receiving data by any one of the different bandwidths (a1, a2 . . . an) and the second logic circuit 220 determines that the electronic device 10 receives data by any one of the different bandwidths (a1, a2 . . . an), all of the inputs of the first logic circuit 210 receive low level signals, and the first logic circuit 210 outputs a high level signal to the third logic circuit 230. At least one of the inputs of the second logic circuit 220 receives high level signals, thus the second logic circuit 220 outputs a high level signal to the third logic circuit 230. The third logic circuit 230 outputs a high level signal to the switch circuit 250 according to the first logic circuit 210 and the second logic circuit 220, the first port of the switch circuit 250 connects to the second port, and the LED circuit 260 lights (a lit state).

When the second logic circuit 220 determines that the electronic device 10 is not receiving data by any one of the different bandwidths (a1, a2 . . . an), all of the inputs of the first logic circuit 210 receive low level signals, and the first logic circuit 210 outputs a high level signal to the third logic circuit 230. All of the inputs of the second logic circuit 220 receive low level signals, and the second logic circuit 220 outputs a low level signal to the third logic circuit 230. The third logic circuit 230 outputs a low level signal to the switch circuit 250 according to the first logic circuit 210 and the second logic circuit 220, the first port of the switch circuit 250 disconnects from the second port, and the LED circuit 260 does not light (a non-lit state). The LED circuit 260 shows connection status between the electronic device 10 and different bandwidths (a1, a2 . . . an) to save space of the electronic device 10.

Figure 2:
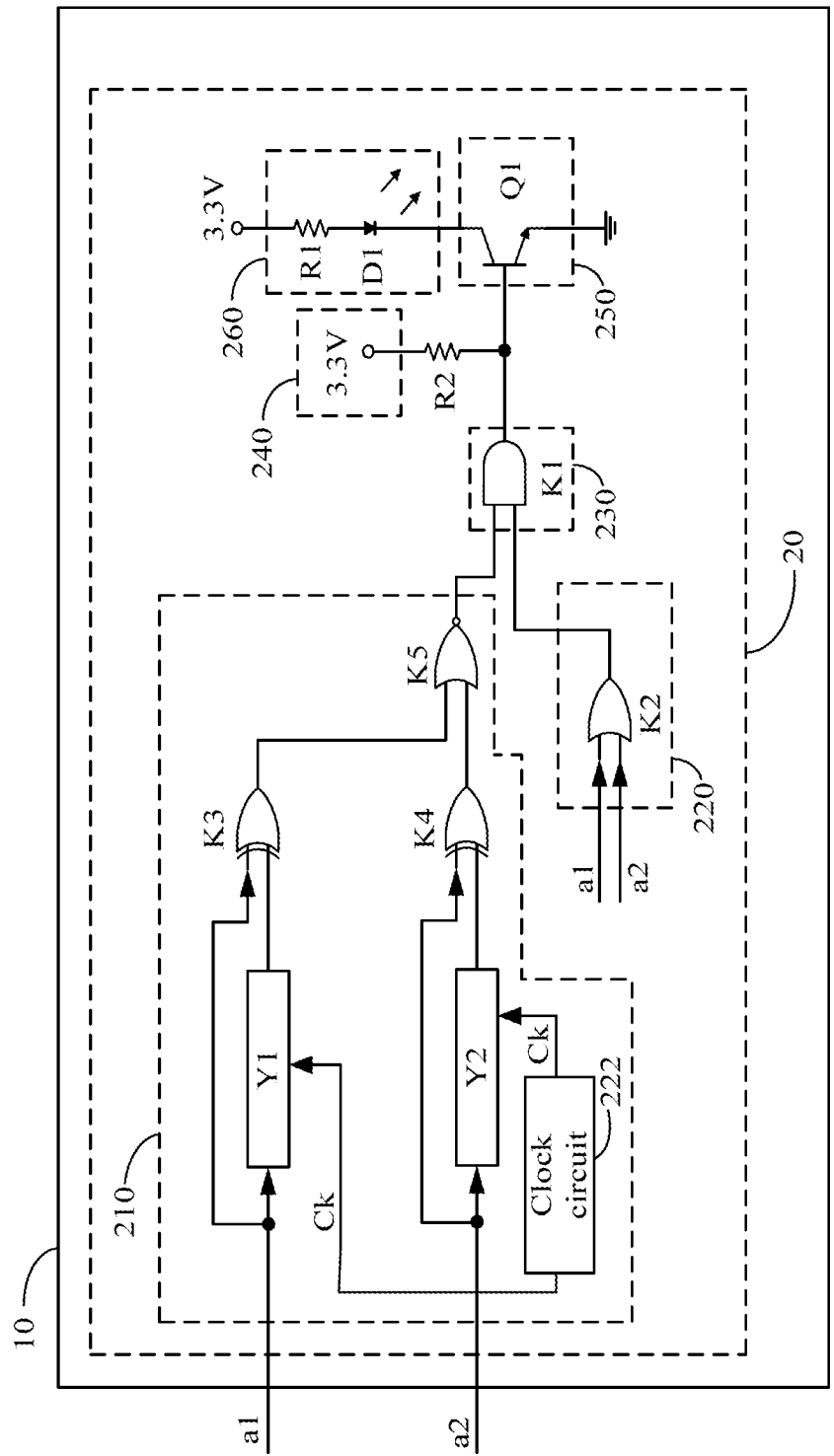
FIG. 2 is a circuit diagram of another embodiment of an indicator circuit and an electronic device.

FIG. 2 is a circuit diagram of another embodiment of an indicator circuit 20 and an electronic device 10. In one embodiment, the electronic device 10 comprises the indicator circuit 20. The electronic device 10 supports two different bandwidths (a first bandwidth a1 and a second bandwidth a2) and comprises the indicator circuit 20, the electronic device 10 can receive data by the first bandwidth a1 and the second bandwidth a2. In one embodiment, the first bandwidth a1 is 2.4G, the second bandwidth a2 is 5G.

In one embodiment, the indicator circuit 20 comprises a first logic circuit 210, a second logic circuit 220, a third logic circuit 230, an auxiliary power circuit 240, a switch circuit 250, and a light emitting diode (LED) circuit 260.

The first logic circuit 210 comprises a clock circuit 222, a first delay circuit Y1, a second delay circuit Y2, a first XOR gate K3, a second XOR gate K4, and a NOR gate K5. In one embodiment, the first delay circuit Y1 comprises a first input, a second input, and a single output, the first input connects to the first bandwidth a1. The clock circuit 222 outputs a time signal Clk. The second input of the first delay circuit Y1 is electronically connected to the clock circuit 222, to receive the time signal Clk. The first XOR gate K3 comprises a first input, a second input, and an output. The first input is electronically connected to the output of the first delay circuit Y1 and the second input is electronically connected to the first input of the first delay circuit Y1. The second delay circuit Y2 comprises a first input, a second input, and a single output, the first input connects to the second bandwidth a2. The second input of the second delay circuit Y2 is electronically connected to the clock circuit 222, to receive a time signal Clk. The second XOR gate K4 comprises a first input, a second input, and an output, the first input is electronically connected to the output of the second delay circuit Y2 and the second input is electronically connected to the first input of the second delay circuit Y2. The NOR gate K5 comprises a first input, a second input, and an output, the first input is electronically connected to the output of the first XOR gate K3. The second input is electronically connected to the output of the second XOR gate K4. The first logic circuit 210 outputs a first decision signal to the third logic circuit 230 if the electronic device 10 receives data either by the first bandwidth a1 or by the second bandwidth a2. In one embodiment, the first decision signal is a level signal. The time signal Clk outputted by the clock circuit 222 is a square wave.

In one embodiment, when the electronic device 10 receives data by any one of the first bandwidth a1 and the second bandwidth a2, the first input of the first delay circuit Y1 and the first input of the second delay circuit Y2 receive level signals changed between a high level and a low level. The NOR gate K5 outputs the first decision signal changed between a high level and a low level to the third logic circuit 230 through the first delay circuit Y1, the second delay circuit Y2, the first XOR gate K3, and the second XOR gate K4. When the electronic device 10 is not receiving data by any one of the first bandwidth a1 and the second bandwidth a2, both of the first input of the first delay circuit Y1 and the first input of the second delay circuit Y2 receive low level signals. The NOR gate K5 outputs a high level signal to the third logic circuit 230 through the first delay circuit Y1, the second delay circuit Y2, the first XOR gate K3, and the second XOR gate K4.

The second logic circuit 220 comprises an OR gate K2. In one embodiment, the OR gate K2 comprises a first input, a second input, and an output. The first input and the second input of the OR gate K2 receive signals indicating whether or not the electronic device 10 is connected to the first bandwidth a1 and the second bandwidth a2, and the output of the OR gate K2 is electronically connected to the third logic circuit 230. The second logic circuit 220 outputs a second decision signal to the third logic circuit 230 if the electronic device 10 is connected to any one of the first bandwidth a1 and the second bandwidth a2.

The third logic circuit 230 comprises an AND gate K1. In one embodiment, the AND gate K1 comprises a first input, a second input, and an output. The first input and the second input of the AND gate K1 are electronically connected to the respective outputs of the NOR gate K5 and the OR gate K2, and the output of the AND gate K1 is electronically connected to the switch circuit 250. The third logic circuit 230 outputs a third decision signal to the switch circuit 250, according to the first decision signal outputted by the first logic circuit 210 and the second decision signal outputted by the second logic circuit 220.

In one embodiment, the switch circuit 250 comprises a transistor Q1. The transistor Q1 comprises a first port, a second port, and a control port, the first port of the transistor Q1 is electronically connected to the LED circuit 260, the second port is grounded, and the control port is electronically connected to the output of the AND gate K1. The transistor Q1 controls the second port to connect to or disconnect from the control port of the transistor Q1 and the first port to connect to or disconnect from the second port of the transistor Q1, to control the lighting or non-lighting of the LED circuit 260, according to the third decision signal. In one embodiment, the transistor Q1 is a MOSFET. In another embodiment, each of the transistors Q1 is an NPN transistor or a PNP transistor, the type of the transistor Q1 can be according to different conduction demands.

The LED circuit 260 comprises a first resistor R1 and an LED D1. One end of the first resistor R1 is electronically connected to an anode of the LED D1, the other end of first resistor R1 is electronically connected to the auxiliary power circuit 240. A cathode of the LED D1 is electronically connected to the first port of the transistor Q1.

In one embodiment, user can adjust frequency of the level signals changed between a high level and a low level of the first logic circuit 210, to adjust the flashing frequency of the LED circuit 260, by adjusting the signal Clk of the clock circuit 222.

In one embodiment, the auxiliary power circuit 240 is a 3.3v source, the indicator circuit 20 comprises a second resistor R2, and the second resistor R2 is electronically connected between the auxiliary power circuit 240 and the transistor Q1. The auxiliary power circuit 240 supplies an auxiliary power signal for the LED circuit 260. When the second port connects to the control port of the transistor Q1, the auxiliary power circuit 240 outputs the auxiliary power signal for the LED circuit 260, to control the first port connecting to the second port of the transistor Q1. In another embodiment, the auxiliary power circuit 240 is not electronically connected to the transistor Q1, the auxiliary power circuit 240 is electronically connected to the LED circuit 260 merely to supply the auxiliary power signal for the LED circuit 260.

FIG. 3 is a truth table of one embodiment of a plurality of logic gates of the electronic device 10 of FIG. 2. In one embodiment, a high level signal is "1", a low level signal is "0". When the first logic circuit 210 determines that electronic device 10 receives data by any one of the first bandwidth a1 and the second bandwidth a2, the first input of the first delay circuit Y1 and the first input of the second delay circuit Y2 receive level signals "1010 . . . " changed between a high level and a low level. The NOR gate K5 outputs the first decision signal "1010 . . . " changed between a high level and a low level to the third logic circuit 230 through the first delay circuit Y1, the second delay circuit Y2, the first XOR gate K3, and the second XOR gate K4. When the second logic circuit 220 determines that the electronic device 10 receives data by any one of the first bandwidth a1 and the second bandwidth a2, at least one of the inputs of the OR gate K2 receives high level signals "1", and the OR gate K2 outputs a high level signal "1" to the third logic circuit 230. The AND gate K1 230 outputs the third decision signal "1010 . . . " changed between a high level and a low level to the switch circuit 250, according to the first decision signal "1010 . . . " outputted by the NOR gate K5 and the high level signal "1" outputted by the OR gate K2. The LED circuit 260 thus switches between a lit and a non-lit state (a flashing state).

When the first logic circuit 210 determines that electronic device 10 does not receive data by any one of the first bandwidth a1 and the second bandwidth a2 and the second logic circuit 220 determines that the electronic device 10 then receives data by any one of the first bandwidth a1 and the second bandwidth a2, both of the first inputs of the first delay circuit Y1 and the second delay circuit Y2 receive low level signals "0". The first logic circuit 210 outputs a high level signal "1" to the third logic circuit 230, according to results of logical operation of the first XOR gate K3, the second XOR gate K4, and the NOR gate K5. At least one of the inputs of the OR gate K2 receives high level signals "1", and the OR gate K2 outputs a high level signal "1" to the third logic circuit 230. The third logic circuit 230 outputs a high level signal "1" to the switch circuit 250, according to the high level signal "1" outputted by the first logic circuit 210 and the high level signal "1" outputted by the OR gate K2. The first port connects to the second port of the switch circuit 250, and the LED circuit 260 lights (a lit state).

When the second logic circuit 220 determines that the electronic device 10 does not receives data by any one of the first bandwidth a1 and the second bandwidth a2, both of the first inputs of the first delay circuit Y1 and the second delay circuit Y2 receive low level signals "0". The first logic circuit 210 outputs a high level signal "1" to the third logic circuit 230, according to results of logical operation of the first XOR gate K3, the second XOR gate K4, and the NOR gate K5. Both of the inputs of the OR gate K2 receive low level signals "0", and the OR gate K2 outputs a low level signal "0" to the third logic circuit 230. The third logic circuit 230 outputs a low level signal to the switch circuit 250 according to the high level signal "1" outputted by the first logic circuit 210 and the low level signal "0" outputted by the OR gate K2. The first port is disconnected from the second port of the switch circuit 250, and the LED circuit 260 does not light (a non-lit state). The LED circuit 260 shows connection status between the electronic device 10 and the first and second bandwidths, a1 and a2, to save space of the electronic device 10.

In at least one embodiment, the electronic device 10 of FIG. 2 transmits or receives the signals by a plurality of different bandwidth (a1, a2 . . . an), and delay circuits, XOR gates, NOR gates, and OR gates, as a single group, are added for each additional bandwidth.

The electronic device 10 comprises the indicator circuit 20. The indicator circuit 20 comprises the first logic circuit 210, the second logic circuit 220, the third logic circuit 230, the auxiliary power circuit 240, the switch circuit 250, and the LED circuit 260.

The foregoing description of the various embodiments has been presented for purposes of illustration and explanation. The embodiments are therefore not intended to be exhaustive or to limit the claims to the precise forms disclosed. Many variations and modifications of the embodiments described herein will be apparent to one of ordinary skill in the art in the light of the above disclosure. The scope is to be defined only by the claims appended hereto and their equivalents. The embodiments described, being illustrated only, are not to be construed as limiting the scope of the following claims.

What is claimed is:

1. An indicator circuit in an electronic device supporting a plurality of different bandwidths, the indicator circuit comprising:
   a first logic circuit configured to output a first decision signal dependent upon whether or not the electronic device is receiving data by any one of the different bandwidths;
   a second logic circuit configured to output a second decision signal dependent upon whether or not the electronic device is receiving data by any one of the different bandwidths;
   a third logic circuit configured to receive the first decision signal and the second decision signal, and to output a third decision signal according to the first decision signal and the second decision signal;
   a light emitting diode (LED) circuit; and
   a switch circuit electronically connected to the LED circuit and the third logic circuit, configured to receive the third decision signal and control, according to the third decision signal, whether or not the LED circuit is activating to be lighted;
   wherein the switch circuit comprises:
   a control port connected to the third logic circuit to receive the third decision signal;
   a first port connected to the LED circuit; and
   a second port; and
   wherein whether the first port of the switch circuit is connected or not connected to the second port depends upon the third decision signal, the LED circuit lights upon a condition that the first port of the switch circuit is connected to the second port, and the LED circuit does not light upon a condition that the first port of the switch circuit is not connected to the second port.

2. The indicator circuit of claim 1, wherein the second port of the switch circuit is connected to the ground.

3. The indicator circuit of claim 2, further comprising an auxiliary power circuit which is electronically connected to a node between the third logic circuit and the switch circuit, to auxiliarily control that the first port connects to the second port of the switch circuit.

4. The indicator circuit of claim 3, further comprising:
   a first resistor electronically connected between the auxiliary power circuit and the switch circuit.

5. The indicator circuit of claim 1, wherein the first decision signal, the second decision signal, and the third decision signal are level signals.

6. The indicator circuit of claim 2, wherein the third decision signal is a series of alternative high level and low level signals dependent upon the electronic device being receiving data by any one of the different bandwidths, and wherein the first port of the switch circuit alternatively connects to and disconnects from the second ports, which makes the LED circuit switch between lighting and non-lighting.

7. The indicator circuit of claim 6, wherein in response to the first logic circuit determines that the electronic device being not receiving data by any one of the different bandwidths and the second logic circuit determines that the electronic device being receiving data by any one of the different bandwidths, the third decision signal is a high level signal, and wherein the first port of the switch circuit connects to the second ports, which makes the LED circuit light.

8. The indicator circuit of claim 6, wherein in response to the second logic circuit determines that the electronic device being receiving data by any one of the plurality of different bandwidth, the third decision signal is a low level signal, and wherein the first port of the switch circuit does not connect to the second ports, which makes the LED circuit do not light.

9. The indicator circuit of claim 1, wherein the first logic circuit comprises:
   a clock circuit outputting a time signal;
   a plurality of delay circuits, wherein each of the delay circuits comprises a first input, a second input, and an output, the second inputs of the delay circuits are electronically connected to the clock circuit;
   a plurality of XOR gates, wherein each of the XOR gates comprises a first input, a second input, and an output, the first inputs of the XOR gates are electronically connected to the outputs of the delay circuits respectively, the second inputs of the XOR gates are electronically connected to the first inputs of the delay circuits respectively; and
   a NOR gate comprising an output and a plurality of inputs, the inputs of the NOR gate are electronically connected to the outputs of the XOR gates, the output of the NOR gate is electronically connected to the third logic circuit.

10. The indicator circuit of claim 9, wherein flashing frequency of the LED circuit is adjusted by the time signal of the clock circuit.

11. The indicator circuit of claim 1, wherein the second logic circuit comprises an OR gate, the third logic circuit comprises a AND gate, the switch circuit comprises a transistor, the LED circuit comprises a LED and a second resistor.

12. The indicator circuit of claim 1, wherein the different bandwidths are 2.4 gigabytes per second (G) and 5G.

13. An electronic device supporting a plurality of different bandwidths, and comprising an indicator circuit, the indicator circuit comprising:
   a first logic circuit configured to output a first decision signal dependent upon whether or not the electronic device is receiving data by any one of the different bandwidths;
   a second logic circuit configured to output a second decision signal dependent upon whether or not the electronic device is receiving data by any one of the different bandwidths;

a third logic circuit configured to receive the first decision signal and the second decision signal, and to output a third decision signal according to the first decision signal and the second decision signal;

a light emitting diode (LED) circuit; and a switch circuit electronically connected to the LED circuit and the third logic circuit, configured to receive the third decision signal and control, according to the third decision signal, whether or not the LED circuit is activating to be lighted;

wherein the switch circuit comprises:

a control port connected to the third logic circuit to receive the third decision signal;

a first port connected to the LED circuit; and a second port;

wherein whether the first port of the switch circuit is connected or not connected to the second port depends upon the third decision signal, the LED circuit lights upon a condition that the first port of the switch circuit is connected to the second port, and the LED circuit does not light upon a condition that the first port of the switch circuit is not connected to the second port.

14. The electronic device of claim 13, wherein the second port of the switch circuit is connected to ground.

15. The electronic device of claim 14, further comprising an auxiliary power circuit which is electronically connected to a node between the third logic circuit and the switch circuit, to auxiliarily control that the first port connects to the second port of the switch circuit.

16. The electronic device of claim 15, further comprising:

a first resistor electronically connected between the auxiliary power circuit and the switch circuit.

17. The electronic device of claim 14, wherein the third decision signal is a series of alternative high level and low level signals dependent upon the electronic device being receiving data by any one of the different bandwidths, and wherein the first port alternatively connects to and disconnects from the second ports, which makes the LED circuit switch between lighting and non-lighting.

18. The electronic device of claim 14, wherein in response to the first logic circuit determines that the electronic device being not receiving data by any one of the different bandwidths and the second logic circuit determines that the electronic device being receiving data by any one of the different bandwidths, the third decision signal is a high level signal, and wherein the first port connects to the second ports, which makes the LED circuit light.

19. The electronic device of claim 14, wherein in response to the second logic circuit determines that the electronic device being not receiving data by any one of the plurality of different bandwidth, the third decision signal is a low level signal, and wherein the first port disconnects from the second ports, which makes the LED circuit not light.

20. The electronic device of claim 13, wherein the first logic circuit comprises:

a clock circuit outputting a time signal;

a plurality of delay circuits, wherein each of the delay circuits comprises a first input, a second input, and an output, the second inputs of the delay circuits are electronically connected to the clock circuit;

a plurality of XOR gates, wherein each of the XOR gates comprises a first input, a second input, and an output, the first inputs of the XOR gates are electronically connected to the outputs of the delay circuits respectively, the second inputs of the XOR gates are electronically connected to the first inputs of the delay circuits respectively; and a NOR gate comprising an output and a plurality of inputs, the inputs of the NOR gate are electronically connected to the outputs of the XOR gates, the output of the NOR gate is electronically connected to the third logic circuit.

* * * * *